United States Patent
Kim

(10) Patent No.: US 7,261,067 B2
(45) Date of Patent: Aug. 28, 2007

(54) THERMOSTAT MONITORING SYSTEM OF VEHICLE AND METHOD THEREOF

(75) Inventor: Hyung Kee Kim, Anyang-si (KR)

(73) Assignee: Hyundai Motor Company, Seocho-Ku, Seoul (KR)

(*) Notice: Subject to any disclaimer, the term of this patent is extended or adjusted under 35 U.S.C. 154(b) by 438 days.

(21) Appl. No.: 11/022,259

(22) Filed: Dec. 23, 2004

(65) Prior Publication Data

US 2005/0224019 A1   Oct. 13, 2005

(30) Foreign Application Priority Data

Apr. 8, 2004   (KR)   ..................... 10-2004-0024129

(51) Int. Cl.
*F01P 5/14*   (2006.01)
*G01L 3/26*   (2006.01)

(52) U.S. Cl. .................... 123/41.15; 73/118.1; 701/112

(58) Field of Classification Search ............... 123/41.1, 123/41.15; 73/116, 118.1; 701/112
See application file for complete search history.

(56) References Cited

U.S. PATENT DOCUMENTS 7,010,967 B2 *   3/2006   Wakahara et al. ......... 73/118.1

FOREIGN PATENT DOCUMENTS

JP   2001-349218   12/2001

* cited by examiner

*Primary Examiner*—Noah P. Kamen
(74) *Attorney, Agent, or Firm*—Morgan Lewis & Bockius LLP

(57) ABSTRACT

A thermostat monitoring system is provided which comprises a coolant temperature detection member for detecting a temperature of a coolant. An intake air temperature detection member detects a temperature of ambient air introduced into combustion chambers. An intake air amount detection member detects an amount of intake air. An engine speed detection member detects an engine speed; a blower switch detects a selected contacting point for driving a blower motor; and a control unit calculates a primary modeled coolant temperature and an auxiliary modeled coolant temperature based on information detected by the coolant temperature detection member, the intake air temperature detection member, the intake air amount detection member, the engine speed detection member, and the blower switch, and for monitoring using the primary modeled coolant temperature and the auxiliary modeled coolant temperature to determine whether a thermostat is in a stuck-open state.

16 Claims, 4 Drawing Sheets

THERMOSTAT MONITORING SYSTEM OF VEHICLE AND METHOD THEREOF

CROSS REFERENCE TO RELATED APPLICATIONS

This application claims priority of Korean application No. 10-2004-0024129, filed on Apr. 8, 2004, the disclosure of which is incorporated herein by reference.

TECHNICAL FIELD OF THE INVENTION

The present invention relates to a system and a method for monitoring a thermostat of a vehicle.

BACKGROUND OF THE INVENTION

Generally, a thermostat is installed between an engine and a radiator, and it is automatically opened or closed in response to a change of a coolant temperature such that an amount of coolant flowing to the radiator is regulated, and thereby a temperature of the engine is maintained to be constant so that overheating or overcooling of the engine can be prevented. Therefore, the engine may operate at its highest performance level. In addition, the thermostat increases efficiency of heating an inner space of a vehicle, prevents consumption of coolant, and maintains the temperature of the coolant.

Generally, there are pellet-type thermostats and bellows-type thermostats. Because the pellet-type thermostat is affected by pressure less than the bellows-type thermostat, the pellet-type thermostat can control temperature more precisely than the bellows-type thermostat and is thus more widely used.

If the thermostat is stuck in an open state, control of the amount of coolant flowing between the engine and the radiator cannot be normally performed. Therefore, the warm-up period for the engine becomes longer when compared to a normal state, so exhaust emission characteristics become deteriorated. For this reason, on board diagnostics regulation No. 2 (OBD2) forces monitoring of whether the thermostat is in a stuck-open state if the coolant temperature and intake air temperature are higher than −7°, and illumination of an MIL (malfunction illumination lamp) when it is determined that the thermostat is in the stuck-open state.

For this operation, an ECU (engine control unit) monitors the coolant temperature. A coolant temperature is used as an initial value, and a coolant temperature rising gradient is calculated using an engine load in response to a detected amount of air. Then, the ECU calculates a modeled coolant temperature.

The modeled coolant temperature is then compared with the actual coolant temperature. If the actual coolant temperature is lower than the modeled coolant temperature in a specific instance (e.g., an instance when the actual coolant temperature is 85°), it is determined that the thermostat is in a stuck-open state and the MIL is illuminated.

However, even if the thermostat operates normally, the actual coolant temperature rises very slowly in a cold area because the ambient air temperature is low. In addition, in an RV (recreation vehicle), the actual coolant temperature also rises slowly because the passenger room of the RV is relatively large so that the amount of coolant that is sent to the heater core is much larger than that of a normal vehicle. In such cases, even when the thermostats operate normally, it may be erroneously determined that the thermostat is in a stuck-open state.

A problem with the prior art is illustrated in FIG. 3. If it is determined that the actual coolant temperature A is lower than the modeled coolant temperature B at a specific instance in which the engine is sufficiently warmed up after starting the engine, the MIL is illuminated at C to notify the driver of that the thermostat is in the stuck-open state. Thus, in the thermostat monitoring method according to the prior art as stated above, it can be erroneously determined that the normally operated thermostat is in the stuck-open state when a vehicle is driven in a very cold area or in a low load state.

In addition, if a heater blower is operated such that heat from coolant flowing to a heater core is taken into the inner space of the vehicle in order to improve heating efficiency, the temperature of the coolant rises slowly. Under this situation, if a vehicle is driven in a low load state, the temperature of the coolant may drop, so that the MIL can be illuminated.

If the prohibition condition is strengthened in order to solve such a problem, the above-stated problem can be solved. However, regulations for monitoring times in the OBD-2 cannot be met.

The information disclosed in this Background of the Invention section is only for enhancement of understanding of the background of the invention, and should not be taken as an acknowledgement or any form of suggestion that this information forms the prior art that is already known to a person skilled in the art.

SUMMARY OF THE INVENTION

Embodiments of the present invention provide a thermostat monitoring system and method that use a primary coolant temperature modeling method and an auxiliary coolant temperature modeling method, and thereby increase stability and credibility of monitoring a stuck-open state of a thermostat.

In a preferred embodiment of the present invention a thermostat monitoring system comprises: a coolant temperature detection member for detecting a temperature of a coolant; an intake air temperature detection member for detecting a temperature of ambient air introduced into combustion chambers; an intake air amount detection member for detecting an amount of intake air; an engine speed detection member for detecting an engine speed; a blower switch for detecting a selected contacting point for driving a blower motor; and a control unit for calculating a primary modeled coolant temperature and an auxiliary modeled coolant temperature based on information detected by the coolant temperature detection member, the intake air temperature detection member, the intake air amount detection member, the engine speed detection member, and the blower switch, and for monitoring using the primary modeled coolant temperature and the auxiliary modeled coolant temperature to determine whether a thermostat is in a stuck-open state.

Preferably, the thermostat monitoring system further comprises an alarm device operated by a control signal of the control unit when it is determined that the thermostat is in the stuck-open state.

It is preferable that the control unit sets a coolant temperature when the engine starts as an initial value and calculates a coolant temperature rising gradient using an engine load in response to a detected amount of air, and the control unit calculates a primary modeled coolant temperature as follows: (primary modeled coolant temperature)= (initial value)+(initial value)×(coolant temperature rising gradient).

It is also preferable that the control unit calculates an auxiliary modeled coolant temperature as follows: (auxiliary modeled coolant temperature)=(primary modeled coolant temperature)×(ambient air temperature compensation factor)×(blower compensation factor)×(engine speed compensation factor).

It is further preferable that the ambient air temperature compensation factor is determined in response to a temperature of ambient air, and the ambient air temperature compensation factor is set as 0.5 when the ambient air temperature is a predetermined reference temperature (−7°) and as 1.0 when the ambient air temperature is 30°.

Preferably, the blower compensation factor is set as 0.5 when the blower operates maximally and as 1.0 when the blower is in an off state, and the blower compensation factor is applied only when the ambient air temperature is lower than 5°.

It is preferable that the engine speed compensation factor is determined in response to an engine speed, and the engine speed compensation factor is set as 0.7 when the engine speed is 1000 RPM, and as 1.0 when the engine speed is 1500 RPM, and if the engine speed is between 1000 and 1500 RPM, the engine speed compensation factor is calculated through interpolation.

Preferably, the control unit substitutes the primary modeled coolant temperature with the auxiliary modeled coolant temperature if the primary modeled coolant temperature is lower than the auxiliary modeled coolant temperature.

In another embodiment of the present invention, a thermostat monitoring method comprises: determining whether a thermostat monitoring condition exists if an engine is started; calculating a primary modeled coolant temperature if it is determined that the thermostat monitoring condition exists; reading an intake air temperature and then calculating a modeled ambient air temperature, and determining whether the calculated modeled ambient air temperature is lower than a predetermined reference ambient air temperature; terminating monitoring if the modeled ambient air temperature is lower than the predetermined reference temperature, and calculating an auxiliary modeled coolant temperature by reading an engine speed if the modeled ambient air temperature is not lower than the predetermined reference temperature; comparing the primary modeled coolant temperature and the auxiliary modeled coolant temperature; re-calculating the primary modeled coolant temperature by substituting the primary modeled coolant temperature with the auxiliary modeled coolant temperature if the auxiliary modeled coolant temperature is lower than the primary modeled coolant temperature, and then determining whether the actual coolant temperature is higher than a predetermined first reference temperature; determining that the thermostat is in a normal state if the actual coolant temperature is higher than a predetermined first reference temperature, and determining whether the primary modeled coolant temperature is higher than the predetermined first reference temperature if the actual coolant temperature is not higher than the first predetermined reference temperature; determining whether the actual coolant temperature is higher than a predetermined second reference temperature if the primary modeled coolant temperature is higher than the predetermined first reference temperature; determining that the thermostat is in a normal state if the actual coolant temperature is higher than the predetermined second reference temperature, and determining whether a monitoring prohibition condition exists if the actual coolant temperature is not higher than the predetermined second reference temperature; and determining that the thermostat is in a stuck-open state and illuminating an alarming device if the monitoring prohibition condition does not exist.

The thermostat monitoring method preferably further comprises determining a monitoring prohibition state if the monitoring prohibition condition exists.

It is preferable that the modeled ambient air temperature is determined as a value obtained by subtracting an offset value from an intake air temperature in a state in which a vehicle speed is higher than 30 kph.

Preferably, the auxiliary modeled coolant temperature is calculated using the primary modeled coolant temperature, an ambient air temperature compensation factor, a blower compensation factor, and an engine speed compensation factor.

It is preferable that the procedure is returned to re-calculating the primary modeled coolant temperature if the primary modeled coolant temperature is not higher than the predetermined first reference temperature.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
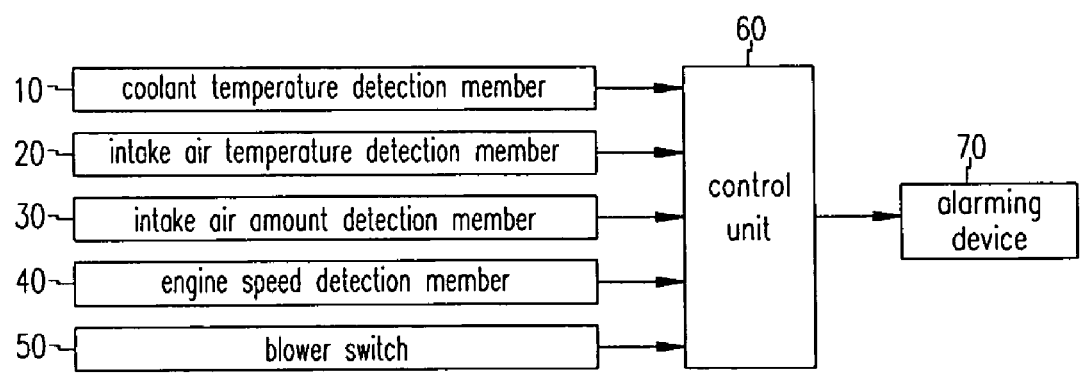
FIG. 1 is a schematic block diagram of a thermostat monitoring system according to an embodiment of the present invention.

Referring to FIG. 1, a thermostat monitoring system according to an embodiment of the present invention comprises a coolant temperature detection member 10, an intake air temperature detection member 20, an intake air amount detection member 30, an engine speed detection member 40, a blower switch 50, and a control unit 60. The thermostat monitoring system may further comprise an alarm device 70, which can be an a lamp or a buzzer. Control unit 60 may comprise a processor and associated hardware and software as may be selected and programmed by a person of ordinary skill in the art based on the teachings contained herein.

The coolant temperature detection member 10 detects a temperature of coolant and outputs a corresponding electrical signal. The intake air temperature detection member 20 detects the temperature of intake air introduced to combustion chambers and outputs a corresponding electrical signal. The intake air amount detection member 30 detects an amount of intake air and outputs a corresponding electrical signal. The engine speed detection member 40 detects the revolution speed of an engine and outputs a corresponding electrical signal. The blower switch 50 detects a contacting point selected for driving a blower motor and outputs a corresponding electrical signal.

Figure 3:
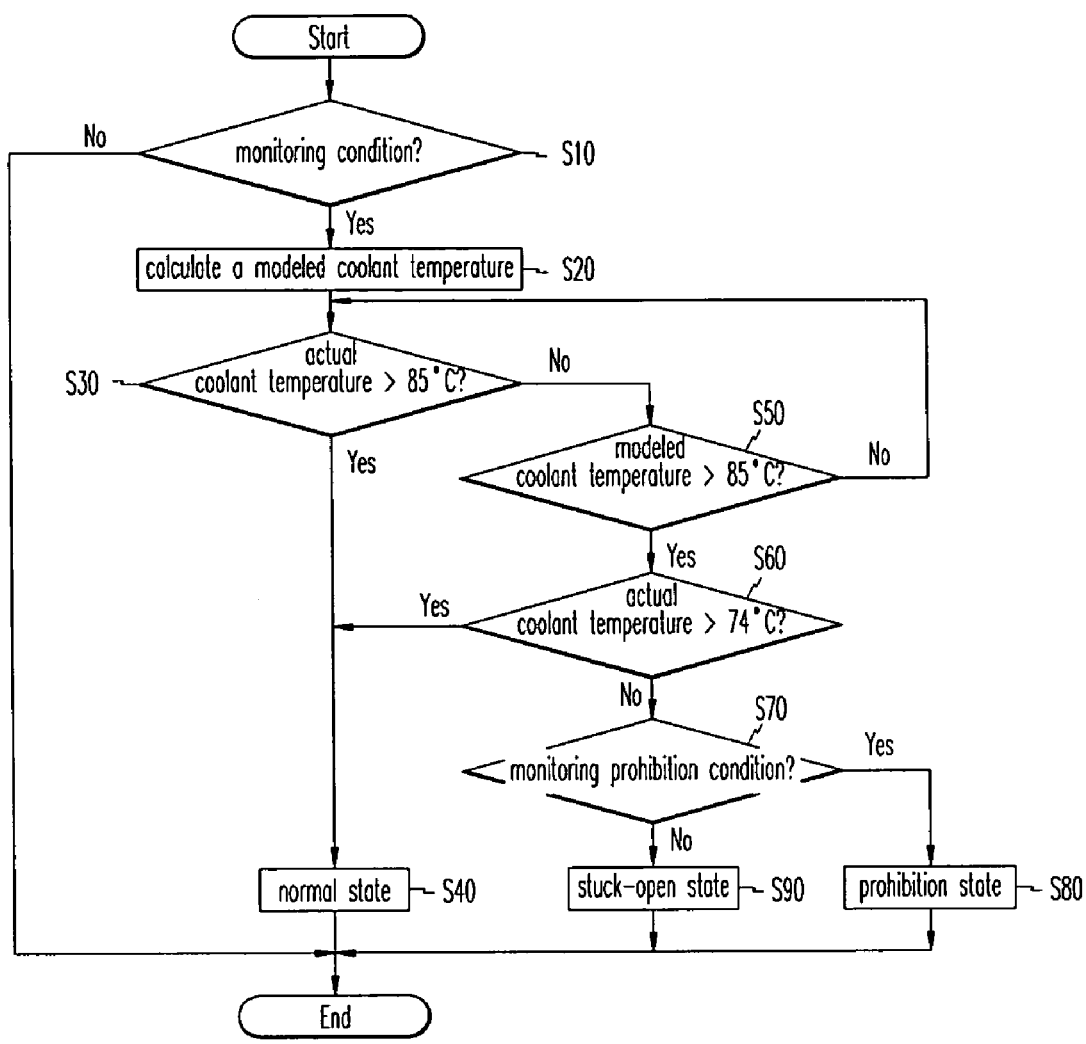
FIG. 3 is a graphical representation of thermostat monitoring according to the present invention.
Figure 4:
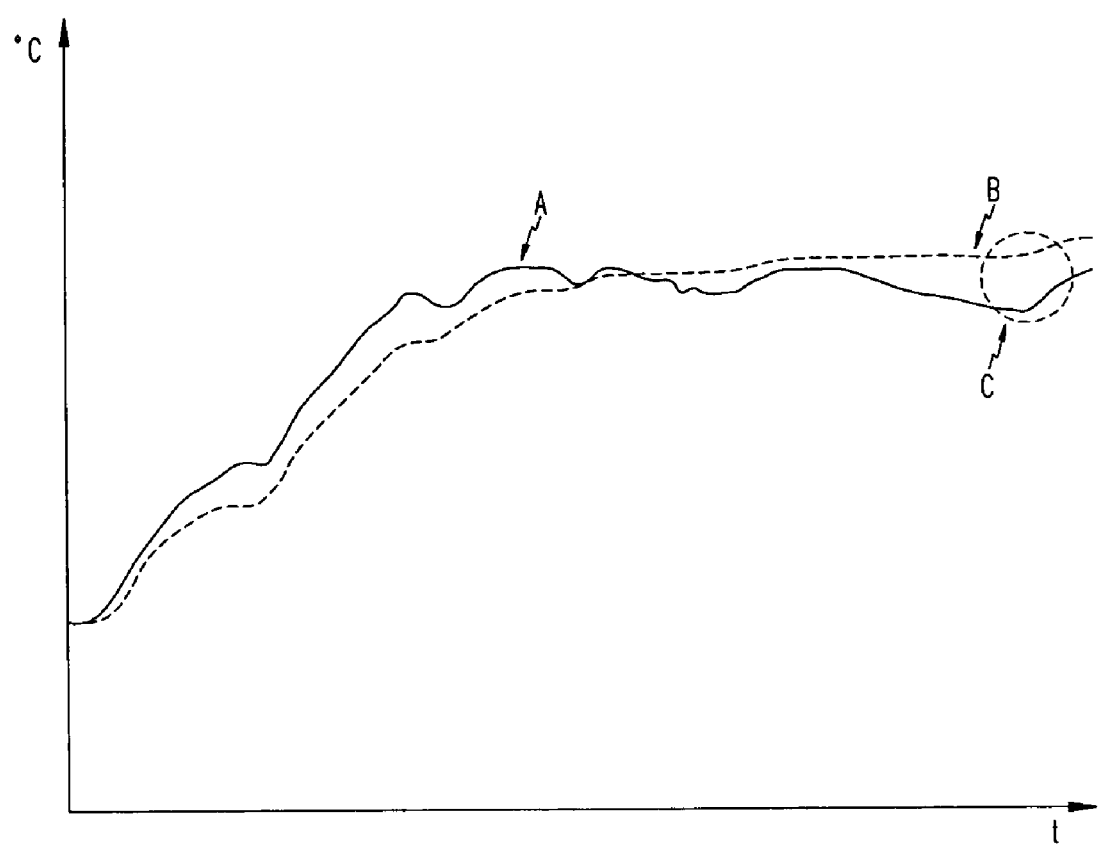
FIG. 4 is a graphical illustration of a result of a misjudgment in the thermostat monitoring method according to the prior art.

The control unit 60 performs the primary coolant temperature modeling and the auxiliary coolant temperature modeling based on signals from the above-stated members, and monitors whether a thermostat is in a stuck-open state. In general, as illustrated in FIG. 3, control unit 60 is programmed in preferred embodiments to maintain the actual temperature higher than the primary modeled temperature at least substantially at all points. Control unit 60 sets a coolant temperature for the engine when it starts as an initial value, and calculates a coolant temperature rising gradient using engine load in response to a detected amount of air. Then, the control unit 60 calculates a primary modeled coolant temperature as follows:

(primary modeled coolant temperature)=(initial value)+(initial value)×(coolant temperature rising gradient).

Control unit 60 then performs the auxiliary coolant temperature modeling in which an auxiliary modeled coolant temperature is calculated according to the following equation:

(auxiliary modeled coolant temperature)=(primary modeled coolant temperature)×(outside air temperature compensation factor)×(blower compensation factor)×(engine speed compensation factor).

The outside air temperature compensation factor is determined in response to the temperature of ambient air. For example, the outside air temperature compensation factor is set as 0.5 when the ambient air temperature is a predetermined reference temperature (preferably, −7°) and as 1.0 when the ambient air temperature is 30°.

The blower compensation factor is determined in response to a degree of operation of a blower motor. For example, the blower compensation factor is set as 0.5 when the blower operates maximally, and as 1.0 when the blower is in an off state. At this time, the blower compensation factor is applied only when the ambient air temperature is lower than 5°. For example, the degree of the operation of the blower motor is preferably detected based on a signal of the blower switch 50 detecting a contact point selected for driving the blower motor.

The engine speed compensation factor is preferably determined in response to an engine speed (i.e., rpm). For example, the engine speed compensation factor is set as 0.7 when an engine speed is 1000 RPM, and as 1.0 when an engine speed is 1500 RPM. If the engine speed is between 1000 and 1500 RPM, the engine speed compensation factor can be calculated through interpolation. In addition, if the primary modeled coolant temperature is less than the auxiliary modeled coolant temperature, the primary modeled coolant temperature is substituted by the auxiliary modeled coolant temperature.

The alarm device 70 is operated (illuminated or sounded) by a control signal from the control unit 60 when the thermostat is determined to be in the stuck-open state by monitoring an application to the primary coolant temperature modeling and the auxiliary coolant temperature modeling.

Figure 2:
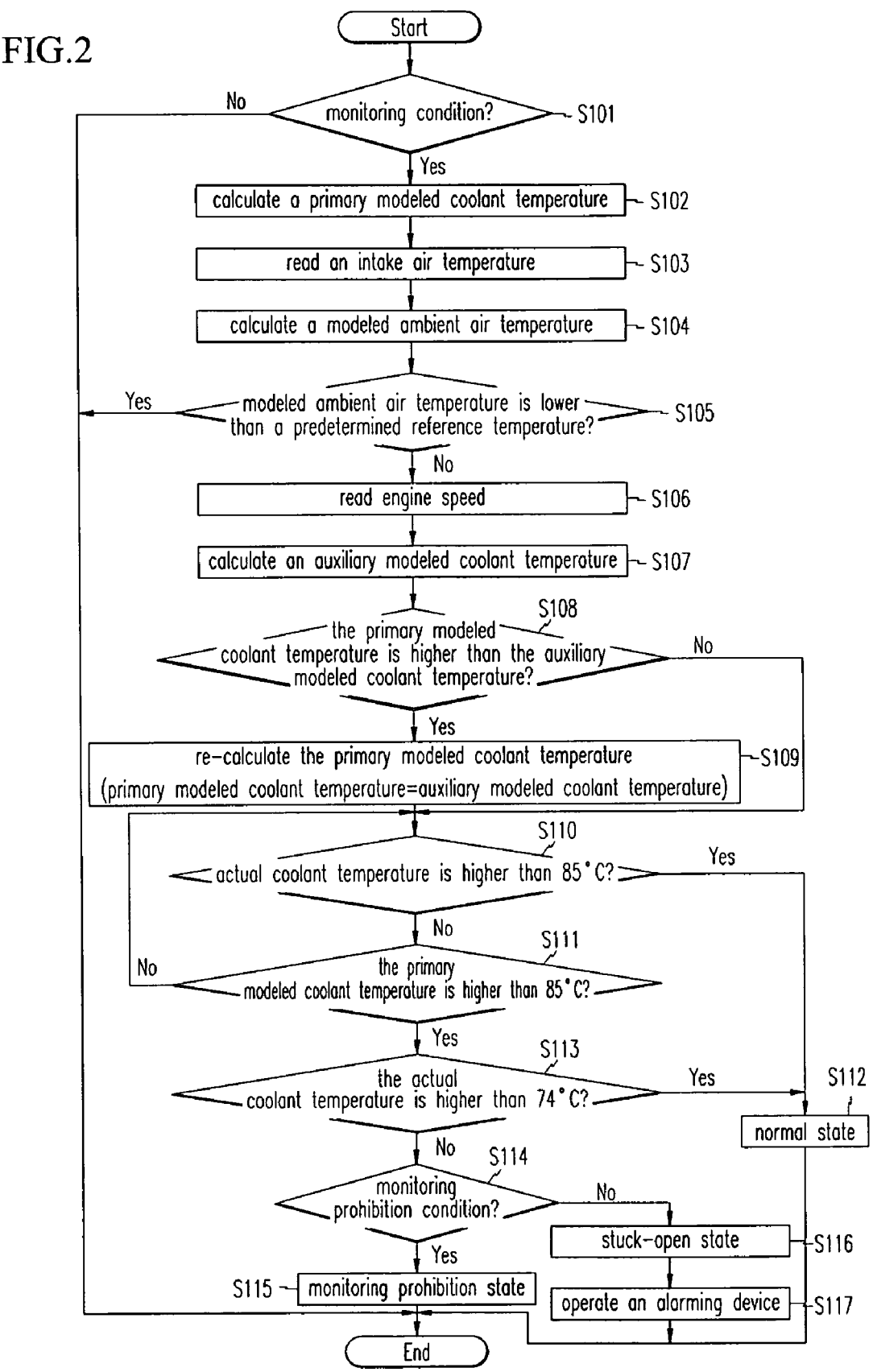
FIG. 2 is a flowchart of a thermostat monitoring method according to an embodiment of the present invention.

Referring to FIG. 2, a thermostat monitoring method according to an embodiment of the present invention will be explained hereinbelow.

After an engine starts, the control unit 60 determines whether a thermostat monitoring condition exists by reading overall information of a vehicle, in step S101.

Preferably, it can be determined that the thermostat monitoring condition exists if a coolant temperature when the engine is started that is detected by the coolant temperature detection member 10 is higher than a predetermined reference temperature (preferably, −7°), if an intake air temperature that is detected by the intake air temperature detection member 20 is higher than a predetermined reference temperature (preferably, −7°), and if a difference between the detected coolant temperature and the detected intake air temperature is less than a predetermined reference temperature (preferably, 6°).

If it is determined that the thermostat monitoring condition does not exist, thermostat monitoring is not performed. On the other hand, if it is determined that the thermostat condition exists, the control unit 60 calculates the primary modeled coolant temperature in step S102. That is, the control unit 60 sets a coolant temperature when the engine starts as an initial value, and calculates a coolant temperature rising gradient using an engine load in response to a detected amount of air. Then, the control unit 60 calculates a primary modeled coolant temperature as follows:

(primary modeled coolant temperature)=(initial value)+(initial value)×(coolant temperature rising gradient).

As stated above, if the primary modeled coolant temperature is calculated, the control unit 60 reads the intake air temperature in step S103, and then calculates a modeled ambient air temperature in step S104.

The modeled ambient air temperature is preferably determined as a value obtained by subtracting an offset value from an intake air temperature in a state in which the vehicle speed is higher than 30 kph.

The offset value is preferably determined in response to a displacement volume of an engine. For example, the offset value can be set as 3° for a 2.0 L engine.

Then, it is determined whether the modeled ambient air temperature is lower than a predetermined reference temperature (preferably, −7°), in step S105.

If it is determined that the modeled ambient air temperature is lower than the predetermined reference temperature in step S105, the control unit 60 stops the thermostat monitoring. On the other hand, if it is determined that the modeled ambient air temperature is not lower than the predetermined reference temperature in step S105, the control unit 60 reads an engine speed (rpm) and then calculates the auxiliary modeled coolant temperature in step S107 as follows:

(auxiliary modeled coolant temperature)=(primary modeled coolant temperature)×(ambient air temperature compensation factor)×(blower compensation factor)×(engine speed compensation factor).

The ambient air temperature compensation factor is determined in response to the temperature of the ambient air. For example, the ambient air temperature compensation factor is set as 0.5 when the ambient air temperature is a predetermined reference temperature (preferably, −7°) and as 1.0 when an ambient air temperature is 30°.

The blower compensation factor is determined in response to a degree of operation of a blower motor. For example, the blower compensation factor is set as 0.5 when the blower operates maximally, and as 1.0 when the blower is in an off state. At this time, the blower compensation factor is applied only when the ambient air temperature is lower than 5°.

The engine speed compensation factor is preferably determined in response to an engine speed (i.e., rpm). For example, the engine speed compensation factor is set as 0.7 when an engine speed is 1000 RPM, and as 1.0 when an engine speed is 1500 RPM. When the engine speed is between 1000 and 1500 RPM, the engine speed compensation factor can be calculated through interpolation.

Then, the control unit 60 determines whether the primary modeled coolant temperature is higher than the auxiliary modeled coolant temperature, in step S108.

If it is determined that the primary modeled coolant temperature is not greater than the auxiliary modeled coolant temperature in step S108, the calculated primary modeled coolant temperature is used. On the other hand, if it is determined that the primary modeled coolant temperature is higher than the auxiliary modeled coolant temperature in step S108, the primary modeled coolant temperature is re-calculated in step S109 by substituting the primary modeled coolant temperature with the auxiliary modeled coolant temperature. The control unit selects lower temperature between the primary modeled coolant temperature and auxiliary modeled coolant temperature after comparing each other.

Then, in step S110, the control unit 60 determines whether a detected actual coolant temperature has reached a predetermined first reference temperature (preferably, 85°). If it is determined that the actual coolant temperature has reached the predetermined first reference temperature in step S110, it is determined that the thermostat is in a normal state, in step S112.

On the other hand, if it is determined that the actual coolant temperature has not reached the predetermined first reference temperature in step S110, the control unit 60 determines whether the primary modeled coolant temperature is greater than the predetermined first reference temperature, in step S111.

If it is determined that the primary modeled coolant temperature is greater than the predetermined first reference temperature in step S111, the control unit 60 determines whether the detected actual coolant temperature is greater than a predetermined second reference temperature (preferably, 74°), in step S113. On the other hand, if it is determined that the primary modeled coolant temperature is not greater than the predetermined first reference temperature in step S111, the procedure returns to step S109.

If it is determined that the actual coolant temperature is higher than the predetermined second reference temperature in step S113, the control unit 60 determines that the thermostat is in a normal state in step S112, and the monitoring procedure is terminated.

However, if it is determined that the actual coolant temperature is not greater than the predetermined second reference temperature in step S113, the control unit 60 determines whether a monitoring prohibition condition exists in step S114.

It is preferably determined that the monitoring prohibition condition exists if at least one of following conditions exists: if a ratio Time_Load_Low/Time_Load_Total of an accumulated low load time Time_Load_Low for a state in which an engine load is less than 30% to an accumulated total engine load time Time_Load_Total for a total period of an engine operation is greater than a predetermined reference value (preferably, 80%); if a ratio Time_Cut_Off/Time_Load_Total of an accumulated fuel-cutoff time Time_Cut_Off to the accumulated total engine load time Time_Load_Total for a total period of an engine operation is greater than a predetermined reference value (for example 50%); and if a ratio Time_Speed/Time_Load_Total of an accumulated low speed time Time_Speed for a state in which a vehicle speed is less than a predetermined reference speed (preferably 10 kph) to the accumulated total engine load time Time_Load_Total for a total period of an engine operation is greater than a predetermined reference value (preferably, 50%).

If it is determined that the monitoring prohibition condition exists in step S114, it is determined that the current state is a monitoring prohibition state, in step S115. On the other hand, if it is determined that the monitoring prohibition condition does not exist in step S114, it is determined that the thermostat is in an abnormal state in which the thermostat is in a stuck-open state in step S116 and then the alarming device 70 is operated in step S117 to warn the driver.

As stated in the above, in the thermostat monitoring according to embodiments of the present invention, a mis-determination of the stuck-open state of the thermostat can be prevented, so that stability and credibility of monitoring a stuck-open state of a thermostat can be increased. Thus, the present invention provides a thermostat monitoring system and method that satisfies the OBD-2.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A thermostat monitoring system, comprising:
a coolant temperature detection element for detecting the coolant temperature;
an intake air temperature detection element for detecting the temperature of ambient air introduced into combustion chambers;
an intake air amount detection element for detecting the amount of intake air;
an engine speed detection member for detecting the engine speed;
a blower switch for detecting a selected contacting point for driving a blower motor; and
a control unit for calculating a primary modeled coolant temperature and an auxiliary modeled coolant temperature based on information detected by the coolant temperature detection element, the intake air temperature detection element, the intake air amount detection element, the engine speed detection element, and the blower switch, and for monitoring using the primary modeled coolant temperature and the auxiliary modeled coolant temperature to determine whether a thermostat is in a stuck-open state.

2. The thermostat monitoring system of claim 1, wherein said control unit is programmed to maintain actual coolant temperature above the primary modeled coolant temperature at least substantially at all times during engine operation.

3. The thermostat monitoring system of claim 1, further comprising an alarm device operated by a control signal from the control unit when it is determined that the thermostat is in the stuck-open state.

4. The thermostat monitoring system of claim 1, wherein the control unit sets a coolant temperature when an engine starts as an initial value and calculates a coolant temperature rising gradient using an engine load responding to a detected amount of air, and wherein the control unit calculates a primary modeled coolant temperature as follows:

(primary modeled coolant temperature)=(initial value)+(initial value)×(coolant temperature rising gradient).

5. The thermostat monitoring system of claim 1, wherein the control unit calculates an auxiliary modeled coolant temperature as follows:

(auxiliary modeled coolant temperature)=(primary modeled coolant temperature)×(ambient air temperature compensation factor)×(blower compensation factor)×(engine speed compensation factor).

6. The thermostat monitoring system of claim 5, wherein the ambient air temperature compensation factor is determined in response to a temperature of ambient air, and the ambient air temperature compensation factor is set as 0.5 when the ambient air temperature is a predetermined reference temperature (−7°) and as 1.0 when the ambient air temperature is 30°.

7. The thermostat monitoring system of claim 5, wherein the blower compensation factor is set as 0.5 when the blower operates maximally and as 1.0 when the blower is in an off state, and the blower compensation factor is applied only when the ambient air temperature is lower than 5°.

8. The thermostat monitoring system of claim 5, wherein the engine speed compensation factor is determined in response to an engine speed, and wherein the engine speed compensation factor is set as 0.7 when an engine speed is 1000 RPM, and as 1.0 when an engine speed is 1500 RPM, and wherein if the engine speed is between 1000 and 1500 RPM, the engine speed compensation factor is calculated through interpolation.

9. The thermostat monitoring system of claim 1, wherein the control unit substitutes the primary modeled coolant temperature with the auxiliary modeled coolant temperature if the primary modeled coolant temperature is higher than the auxiliary modeled coolant temperature.

10. A thermostat monitoring method, comprising:
determining whether a thermostat monitoring condition exists if an engine is started;
calculating a primary modeled coolant temperature if it is determined that the thermostat monitoring condition exists;
reading an intake air temperature and then calculating a modeled ambient air temperature, and determining whether the calculated modeled ambient air temperature is lower than a predetermined reference ambient air temperature;
terminating monitoring if the modeled ambient air temperature is lower than the predetermined reference temperature, and calculating an auxiliary modeled coolant temperature by reading an engine speed if the modeled ambient air temperature is not lower than the predetermined reference temperature;
comparing the primary modeled coolant temperature and the auxiliary modeled coolant temperature;
re-calculating the primary modeled coolant temperature by substituting the primary modeled coolant temperature with the auxiliary modeled coolant temperature if the auxiliary modeled coolant temperature is lower than the primary modeled coolant temperature, and then determining whether an actual coolant temperature is higher than a predetermined first reference temperature;
determining that the thermostat is in a normal state if the actual coolant temperature is higher than a predetermined first reference temperature, and determining whether the primary modeled coolant temperature is higher than the predetermined first reference temperature if the actual coolant temperature is not higher than the first predetermined reference temperature;
determining whether the actual coolant temperature is higher than a predetermined second reference temperature if the primary modeled coolant temperature is higher than the predetermined first reference temperature;
determining that the thermostat is in a normal state if the actual coolant temperature is higher than the predetermined second reference temperature, and determining whether a monitoring prohibition condition exists if the actual coolant temperature is not higher than the predetermined second reference temperature; and
determining that the thermostat is in a stuck-open state and illuminating an alarming device if the monitoring prohibition condition does not exist.

11. The thermostat monitoring method of claim 10, further comprising determining a monitoring prohibition state if the monitoring prohibition condition exists.

12. The thermostat monitoring method of claim 10, wherein the modeled ambient air temperature is determined as a value obtained by subtracting an offset value from an intake air temperature in a state in which a vehicle speed is higher than 30 kph.

13. The thermostat monitoring method of claim 10, wherein the auxiliary modeled coolant temperature is calculated using the primary modeled coolant temperature, an outside air temperature compensation factor, a blower compensation factor, and an engine speed compensation factor.

14. The thermostat monitoring method of claim 10, wherein a procedure is returned to re-calculating the primary modeled coolant temperature if the primary modeled coolant temperature is not higher than the predetermined first reference temperature.

15. The thermostat monitoring method of claim 13, wherein the blower compensation factor is set as 0.5 when the blower operates maximally and as 1.0 when the blower is in an off state, and the blower compensation factor is applied only when the ambient air temperature is lower than 5°.

16. The thermostat monitoring method of claim 13, wherein the engine speed compensation factor is determined in response to an engine speed, and wherein the engine speed compensation factor is set as 0.7 when the engine speed is 1000 RPM, and as 1.0 when the engine speed is 1500 RPM, and wherein if the engine speed is between 1000 and 1500 RPM, the engine speed compensation factor is calculated through interpolation.

* * * * *